United States Patent [19]

Acampora

[11] 4,318,120

[45] Mar. 2, 1982

[54] COLOR TV BURIED SUBCARRIER SYSTEM

[75] Inventor: Alfonse Acampora, Staten Island, N.Y.

[73] Assignee: RCA Corporation, New York, N.Y.

[21] Appl. No.: 171,381

[22] Filed: Jul. 23, 1980

[51] Int. Cl.³ .......................................... H04N 9/493
[52] U.S. Cl. ....................................... 358/12; 358/11
[58] Field of Search .................. 358/12, 15, 1, 11, 17, 358/21 R, 23, 25

[56] References Cited

U.S. PATENT DOCUMENTS 3,610,816 10/1971 Darmstadt et al. ................... 358/11

*Primary Examiner*—Robert L. Richardson

*Attorney, Agent, or Firm*—Samuel Cohen; Robert L. Troike

[57] ABSTRACT

A system including an encoder for translating a standard color TV video signal to a buried subcarrier video signal for transmission, and a decoder for translating the received buried subcarrier video signal back to a standard video signal. A cross-hatch perturbation on screens of TV receivers using the decoded signal can result from the operation of comb filters, local oscillators and mixers in the system when there is an abrupt change in color information in adjacent horizontal lines. The perturbation is prevented by maintaining the respective outputs of the local oscillators in the encoder and the decoder at opposite phases.

11 Claims, 3 Drawing Figures

COLOR TV BURIED SUBCARRIER SYSTEM

This invention relates to systems in which a standard color TV signal is translated to a buried color subcarrier signal for transmission or recording, and is then translated back to a standard color TV signal.

The composite video signal in accordance with NTSC standards includes luminance frequency components from zero to about 4.2 MHz, and chrominance frequency components interleaved with luminance frequency components in a range extending from about 2.3 MHz to about 4.0 MHz about a 3.58 MHz color subcarrier. It is known to translate the NTSC video signal to a buried subcarrier video signal in which the chrominance frequency components extend from about 1.0 MHz to about 2.8 MHz about a 1.53 MHz color subcarrier. The buried subcarrier composite video signal can be limited to frequencies between zero and 3.0 Hz, without losing any of the color information to facilitate the recording of the signal. Upon playback, the recorded buried subcarrier video signal is translated, by means including a comb filter, back to an NTSC video signal for application to standard color TV receivers. However, this NTSC video signal does not have any luminance frequency components above 3.0 MHz, because they were eliminated prior to the recording of the buried subcarrier video signal.

In TV broadcasting, the NTSC color TV video signal is amplitude modulated on a radio-frequency carrier. However, when a standard NTSC color TV video signal is transmitted from one place to another via a satellite, or cable or microwave link, the video signal is normally frequency modulated on a carrier wave. It is found that the standard NTSC video signal has a distribution of energy through the video frequency band of zero to 4.2 MHz, which is not ideal for transmission by frequency modulation. It is accordingly proposed to improve the transmission by translating the NTSC video color signal to a buried subcarrier signal for transmission, and then to restore the signal to a standard NTSC signal for application to standard TV receivers, all while maintaining picture definition quality by not reducing the zero-to-4.2 MHz frequency band of the video signal. It is found that when this is done, crosshatch perturbations appear in the reproduced TV picture when there are large color differences between successive horizontal lines of the picture. The perturbations result because the comb filters cannot prevent chrominance signals from appearing in the luminance channel during one TV line when they are not, and cannot, be cancelled by the different chrominance signal of an adjacent horizontal TV line.

In accordance with an example of the invention, a standard video signal is translated to a buried subcarrier signal at a transmitter using a local oscillator, and is translated back to a standard video signal at a receiver using a second local oscillator. The local oscillators are phase locked at 180° with each other to prevent crosshatch perturbations in a reproduced TV picture when there are large color differences between successive lines in the picture.

Figure 1:
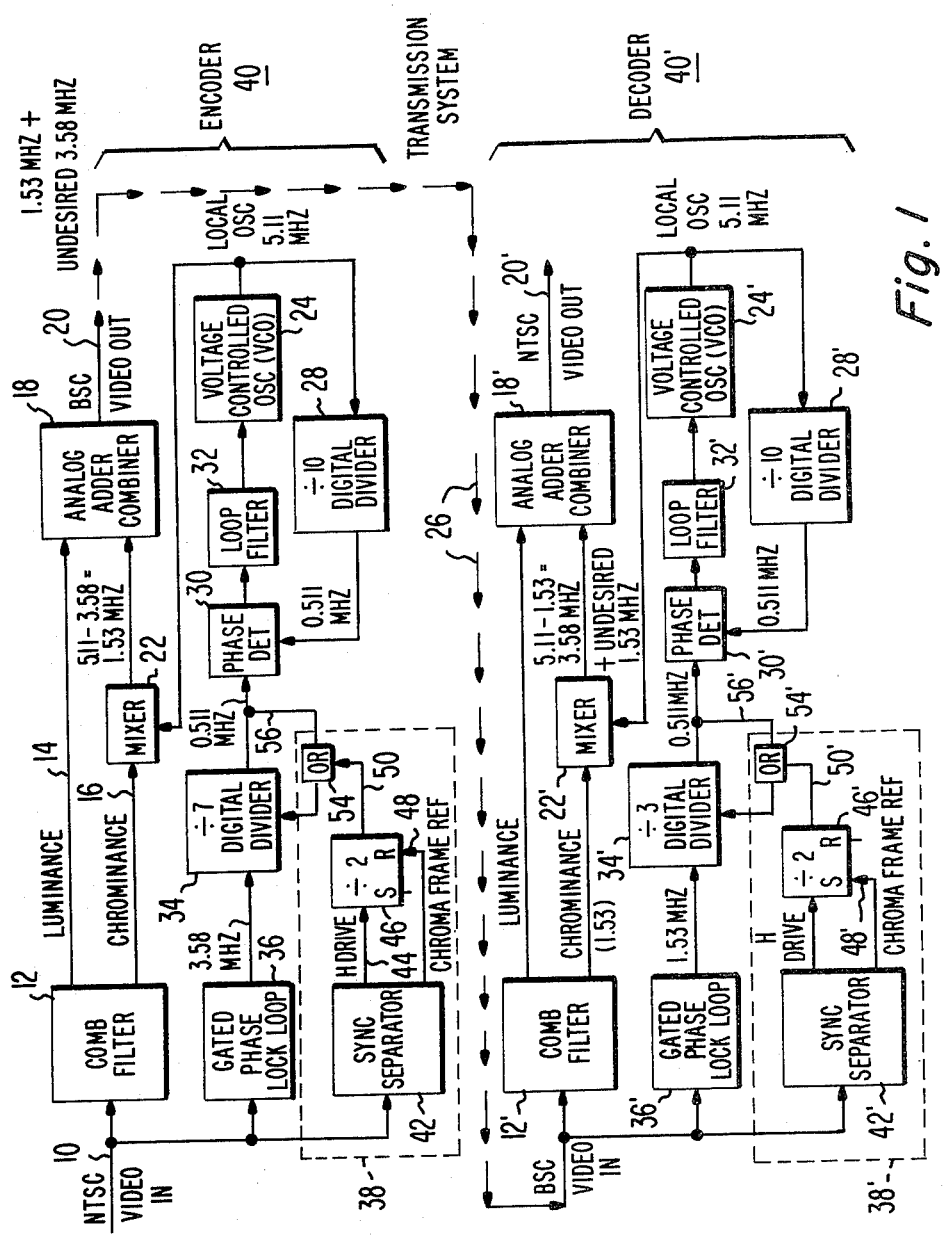
FIG. 1 is a block diagram of a system according to the teachings of the invention which includes an encoder at a transmitting terminal, a transmission path, and a decoder at a receiving terminal.
Figure 3:
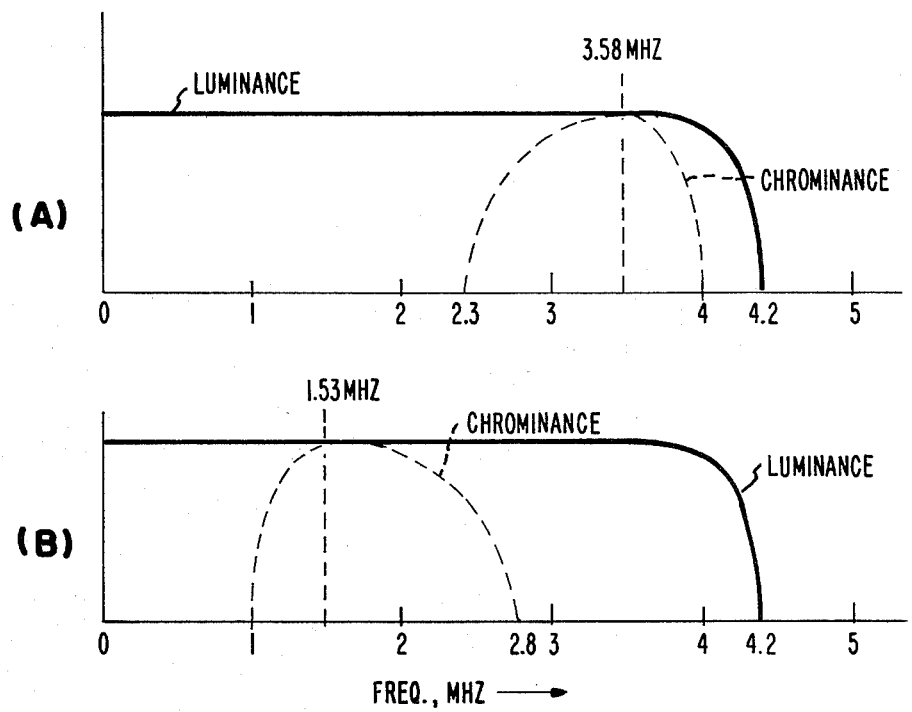
FIG. 3 is a diagram of the ranges of luminance and chrominance frequency components of an NTSC video signal, and a buried subcarrier video signal.

Referring now in greater detail in FIG. 1 for a description of a specific example of a system according to the invention, an input line 10 is supplied with a color TV video signal according to NTSC standards, which is applied to a comb filter 12 having a luminance signal output of 14 and a chrominance signal output at 16. The input standard video signal may be as shown at A in FIG. 3 to include a luminance signal having frequency components from zero to about 4.2 MHz, and a chrominance signal having frequency components from about 2.3 MHz to about 4 MHz about a color subcarrier having a frequency of 3.58 MHz. The chrominance frequency components are clustered about frequencies spaced apart by 15,734 Hz, and the luminance frequency components are clustered about frequencies between the chrominance frequency clusters. As a consequence, the overlapping chrominance and luminance signals can be separated from each other by means of a comb filter such as described in U.S. Pat. No. 3,872,498 issued on Mar. 18, 1975, to D. H. Pritchard on a "Color Information Translating Systems," and assigned to the assignee of the present application.

The luminance signal from comb filter 12 is applied to an analog adder signal combiner 18, and the chrominance signal is applied to a mixer 22 having an output connected to the combiner 18. The mixer 22 is supplied with a 5.11 MHz oscillation from a local voltage-controlled oscillator 24. The mixer heterodynes the received chrominance signal about its color subcarrier of 3.58 MHz to an output difference chrominance signal about a color subcarrier of 1.53 MHz, which is 5.11 MHz minus 3.58 MHz. The output chrominance signal is combined in the combiner 18 with the separated luminance signal to produce a buried subcarrier video TV signal at 20 for transmission to a distant point over path 26. The buried subcarrier TV video signal is as shown at B in FIG. 3.

The encoder at the transmitting terminal also includes means to control the frequency and phase of the 5.11 MHz local oscillation supplied to the mixer 22. The voltage-controlled local oscillator 24 is connected in a phase locked loop including a divide-by-ten digital divider 28 which divides the 5.11 MHz from the local oscillator to 0.511 MHz. The loop also includes a phase detector 30 and a loop filter 32. The loop is phase locked to a 0.511 MHz signal applied to the phase detector 30 from a divide-by-seven digital divider 34 supplied with a 3.58 MHz oscillation from a gated phase locked loop 36. The gated phase locked loop 36 is a standard commercially-available unit used for translating the 3.58 MHz color subcarrier bursts in a standard color TV video signal to a 3.58 MHz continuous wave locked in frequency and phase with the burst.

Note that the phase detector 30 receives one 0.511 MHz input obtained by dividing the 5.11 MHz local oscillation by ten, and another 0.511 MHz input obtained by dividing the received 3.58 MHz color subcarrier by seven. Because of the fixed frequency relationships, including the 10-to-7 ratio of 5.11 MHz to 3.58 MHz, the phase detector 30 causes the 5.11 MHz local oscillation from oscillator 24 to be locked in phase with the 3.58 MHz continuous wave derived from color subcarrier bursts in the received standard video signal.

The encoder 40, without the additional means 38 to be described, is fully operative to translate a standard NTSC color TV video signal having a color subcarrier at 3.58 MHz to a buried subcarrier color TV video signal having a lower-frequency buried subcarrier at 1.53 MHz. The decoder 40' at the receiving terminal is the same as the encoder 40, except that the digital divider 34' divides by three to translate 1.53 MHz to 0.511 MHz, while divider 34 divides 3.58 MHz by seven to translate 1.53 MHz to 0.511 MHz. Also the gated phase locked loop 36' is constructed to translate a received 1.53 MHz color subcarrier burst to a 1.53 MHz continuous wave, instead of acting on a 3.58 MHz burst.

It has been found that in the operation of a system including an encoder 40 and decoder 40', as thus far described, without additional means 38 and 38', there are disturbing cross-hatch perturbations in color TV pictures produced when there is an abrupt change in color in successive horizontal lines in the picture, and when there are abrupt changes in brightness from one line to the next. The perturbations are caused by the inherent operation of the comb filter 12 which normally acts to cancel chrominance information from the luminance output 14, but is unable to do so when successive horizontal lines of the picture contain greatly different colors. Therefore, the buried subcarrier video output at 20 from combiner 18 includes some undesired 3.58 MHz color subcarrier from the luminance channel, as well as the desired 1.53 MHz color subcarrier in the chrominance channel from the mixer 22. Now, when the buried subcarrier video is applied to the decoder 40', the mixer 22' heterodynes the undesired 3.58 MHz color subcarrier to the difference frequency of 1.53 MHz, and heterodynes the desired 1.53 MHz color subcarrier to the desired sum frequency of 3.58 MHz. Consequently, there is an undesired 1.53 MHz color subcarrier component in the NTSC video output signal from combiner 18'. This 1.53 MHz signal causes the objectionable cross-hatch perturbations in color receivers receptive to the NTSC video signal.

This 1.53 MHz signal is cancelled, according to the invention, by additional means 38 and 38' which insure that the 5.11 MHz oscillators 24 and 24' are phase locked in opposite phases differing by 180 degrees. When this is done, the undesired 1.53 MHz color subcarrier at the output of mixer 22' has a phase opposite from the undesired 1.53 MHz color subcarrier supplied to the combiner 18' via the luminance channel output of comb filter 12' from the buried subcarrier video signal output of the combiner 18. The two 1.53 MHz out-of-phase color subcarrier signals cancel each other in the combiner 18'.

The additional means 38 in encoder 40 includes a conventional sync separator 42 receptive to the input NTSC video at 10, and operative to extract horizontal drive synchronizing pulses at output 44 for application to a divide-by-two divider 46, and chroma frame reference pulses at 48 for application as a phasing signal to the divider 46. The output at 50 of the divider 46 comprises alternate ones of the horizontal drive pulses at 44, as determined by the chroma frame reference pulses applied to the reset input R of divider 46. The selected alternate horizontal pulses have a desired fixed time relationship with the vertical synchronizing pulses of the NTSC video signal.

The output at 50 from divider 46 is applied to one input of an "or" gate 54 having another input at 56 from the output of divider 34, and having an output to the "counter load" input of divider 34, as will be described in connection with FIG. 2 which shows divider 34, divider 46, and "or" gate 54 in greater detail. The connection of the output of divider 46 to the "or" gate 54 insures the resetting of the counter in divider 34 at a specific one of the cycles of the 3.58 MHz subcarrier wave applied to the input of divider 34. This, in turn, insures that the local oscillator 24 will be phase locked relative to the specific cycle of the subcarrier wave.

The additional means 38' in the decoder 40' is the same as the additional means 38 in encoder 40, except that the chroma frame reference signal at 48' is applied to the set input S of the divider 46'. This causes the output at 50' of the divider 46' to be the intermediate ones of the horizontal drive pulses, rather than the alternate ones at the output of divider 46, and insures that the 5.11 MHz local oscillator 24' in decoder 40' will be 180 degrees out-of-phase relative to the 5.11 MHz local oscillator 24 in encoder 40. The locked out-of-phase conditions of the two local oscillators 24 and 24' causes the cancellation in combiner 18' of the cross-hatch perturbations in the reproduced TV picture due to the inherent operation of the comb filters.

Figure 2:
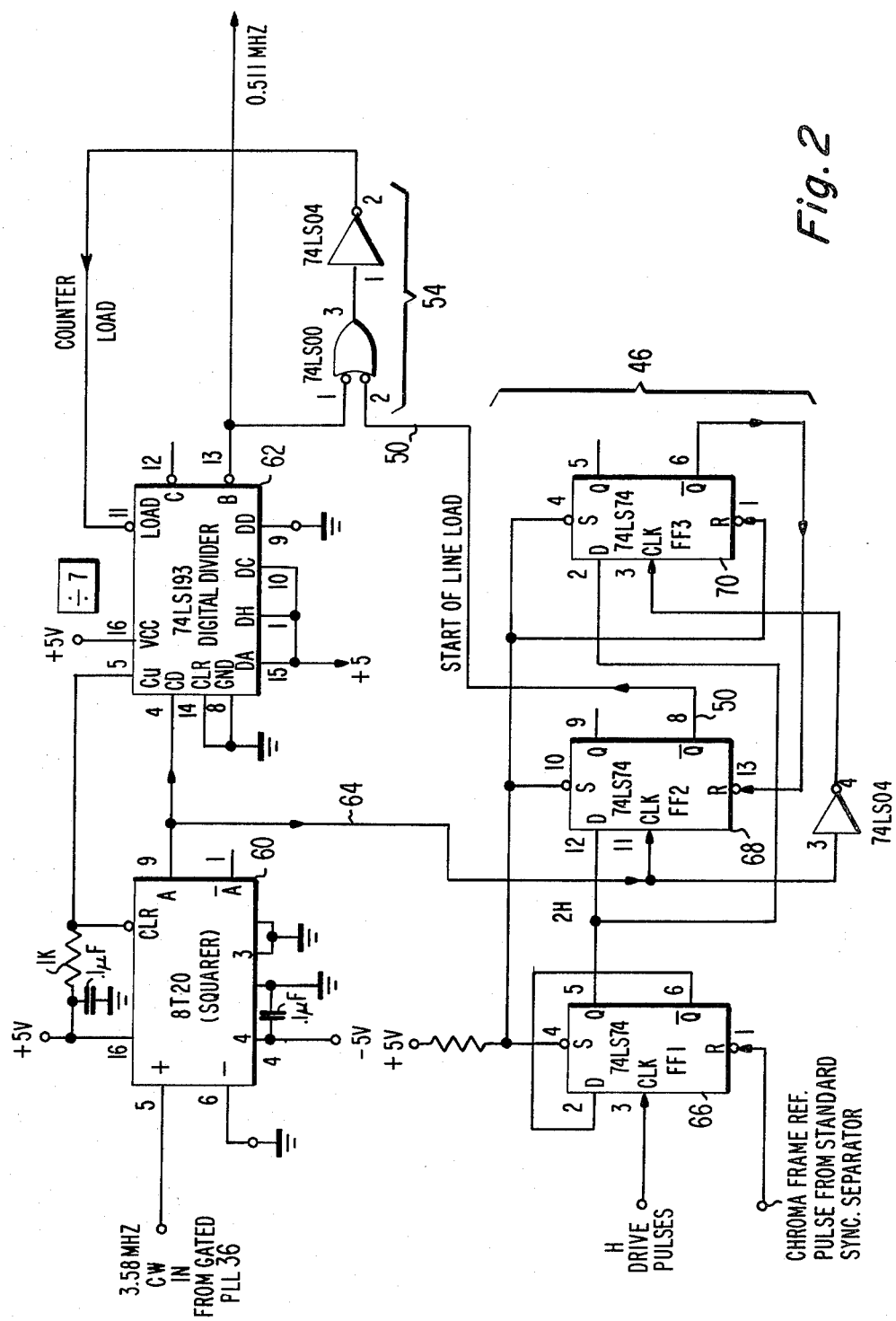
FIG. 2 is a circuit diagram of a portion of the system of FIG. 1.

The digital divider 34 in FIG. 1 is shown in FIG. 2 to consist of a type 8T20 squarer 60 for squaring the 3.58 MHz sine wave obtained from the gated phase lock loop 36, and a type 74LS193 digital divider 62 having terminals connected so that it divides the received 3.58 MHz signal by seven. The connections controlling the operation of digital divider 62 includes a feedback path from the 0.511 MHz output terminal 13 back to a counter load terminal 11. An "and" gate 54 (implemented by a "nand" gate followed by an inverter) connected in the feedback path has another input on line 50 from a second type 75LS74 flip-flop 68 in the divide-by-two divider 46. A first flip-flop 66 has a clock input terminal receptive to horizontal drive pulses from sync separator 42 in FIG. 1, and a reset input R receptive to the chroma frame reference signal from the sync separator. The second flip-flop 68 has a clock input receptive over line 64 to a 3.58 MHz signal from squarer 60, and has a "D" input receptive to pulses having half the horizontal line frequency (half of 15,734 Hz) or twice the line frequency period (2 times H) from the first flip-flop 66, and has a corresponding inverted $\overline{Q}$ output on line 50 to an input of "and" gate 54. A third flip-flop 70 in divider 46 is connected to supply reset pulses to flip-flop 68.

The decoder 40' at the receiving terminal contains a detailed circuit the same as is shown in FIG. 2, except that the squarer 60' is receptive to a color subcarrier at 1.53 MHz, the digital divider 34' is connected to divide-by-three, and the chroma frame reference at 48' is applied to the set input S of the flip-flop 66, rather than the reset input R. The use of the reset input R in the encoder 40 at the transmitting terminal, and the use of the set input S in the decoder 40' at the receiving terminal, insures that the output of the 5.11 MHz local oscillator at the receiving terminal will be 180 degrees out-of-phase with the output of the 5.11 MHz local oscillator at the transmitting terminal. When this out-of-phase relationship is maintained, the cross-hatch perturbations are prevented from appearing on the screens of color TV receivers receptive to the received TV signal, by reason of the cancellation in combiner 18' of the undesired trouble-causing 1.53 MHz signals, as has been described.

It will be understood by those skilled in the art that the invention is not limited to the specific exemplary embodiment of the invention which has been described, but has a scope which is indicated by the appended claims.

What is claimed is:

1. In a system including an encoder for translating a standard TV video signal to a buried subcarrier video signal, and a decoder for translating back to the standard video signal, the combination of
    two similar local oscillators, one in the encoder and the other in the decoder, and
    means to maintain the outputs of said two local oscillators at opposite phases differing by 180 degrees.

2. A system as defined in claim 1 wherein said means to maintain said local oscillators at opposite phases includes means responsive to the horizontal and vertical synchronizing signals in the input video signal.

3. A system as defined in claim 2 wherein said means responsive to the horizontal and vertical synchronizing signals includes a sync separator having horizontal and vertical synchronizing pulse outputs.

4. A system as defined in claim 3 wherein said means responsive to the horizontal and vertical synchronizing signals includes means to pass a selected one of the alternate and intermediate horizontal synchronizing pulses.

5. A system according to claim 1 including means to maintain the outputs of said local oscillators at a frequency equal to the sum of the standard subcarrier frequency and the buried subcarrier frequency.

6. A system according to claim 5 including means to phase lock the local oscillator in the encoder with the received standard color subcarrier, and to phase lock the local oscillator in the decoder with the received buried color subcarrier.

7. A system including an encoder for translating an input standard video signal having a color subcarrier at frequency $f_s$ to an output buried subcarrier video signal having an output color subcarrier at frequency $f_b$, and a decoder for translating the input buried subcarrier video signal back to an output standard video signal having an output color subcarrier at frequency $f_s$, said encoder and decoder each including
    a comb filter to separate the luminance and chrominance signals in the input video signal,
    a phase locked loop including a local oscillator having an output frequency equal to $f_s+f_b$ which is phase locked to the color subcarrier in the input video signal,
    a mixer receptive to said separated chrominance signal and the output of said local oscillator to produce an output chrominance signal having an output color subcarrier frequency,
    means to combine said separated luminance signal with said output chrominance signal, and
    means to operate the local oscillators in the encoder and decoder at opposite phases.

8. The system as defined in claim 7 wherein said means to operate said local oscillators at opposite phases includes means responsive to the horizontal and vertical synchronizing signals in the input video signal.

9. A system as defined in claim 8 wherein said means responsive to the horizontal and vertical synchronizing signals includes a sync separator having horizontal and vertical synchronizing pulse outputs.

10. A system as defined in claim 9 wherein said means responsive to the horizontal and vertical synchronizing signals includes means to pass a selected one of alternate and intermediate horizontal synchronizing pulses.

11. A system as defined in claim 10 wherein said means responsive to the horizontal and vertical synchronizing signals includes means responsive to said selected one of alternate and intermediate horizontal synchronizing pulses to control said phase locked loop.

* * * * *